US008393118B2

(12) United States Patent
Fang et al.

(10) Patent No.: US 8,393,118 B2
(45) Date of Patent: Mar. 12, 2013

(54) FRICTION DAMPING BOLT CONNECTION FOR A WIND TOWER LATTICE STRUCTURE

(75) Inventors: Biao Fang, Clifton Park, NY (US); Huageng Luo, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/334,510

(22) Filed: Dec. 22, 2011

(65) Prior Publication Data

US 2012/0131877 A1    May 31, 2012

(51) Int. Cl.
*E04B 1/98* (2006.01)
(52) U.S. Cl. ............... 52/167.1; 52/651.09; 52/657
(58) Field of Classification Search ...... 52/167.1–167.3, 52/167.7–167.9, 651.09, 653.1, 651.01, FOR. 118, 52/633, 648.1, 651.07; 411/544; 403/85, 403/87, 116, 145, 149, 161, 162, 256, 259, 403/260, 408.1, 71
See application file for complete search history.

(56) References Cited

U.S. PATENT DOCUMENTS

| | | | |
|---|---|---|---|
| 1,057,216 A * | 3/1913 | Bovard | 52/651.02 |
| 1,939,598 A | 12/1933 | Ragsdale | |
| 2,114,901 A | 4/1938 | Henderson | |
| 2,246,151 A * | 6/1941 | Vrooman | 343/843 |
| 3,429,092 A | 2/1969 | Perry et al. | |
| 3,685,866 A | 8/1972 | Patenaude | |
| 3,787,033 A | 1/1974 | Snyder et al. | |
| 3,854,185 A | 12/1974 | Reid | |
| 3,952,472 A | 4/1976 | Boehmig | |
| 3,960,458 A | 6/1976 | Sato et al. | |
| 3,989,396 A | 11/1976 | Matsumoto et al. | |
| 3,989,399 A | 11/1976 | Slowbe | |
| 4,014,089 A | 3/1977 | Sato et al. | |
| 4,111,578 A | 9/1978 | Sato et al. | |
| 4,311,434 A * | 1/1982 | Abe | 416/142 |
| 4,330,221 A | 5/1982 | Stumm | |
| 4,409,765 A * | 10/1983 | Pall | 52/167.1 |
| 4,481,748 A * | 11/1984 | D'Alessio et al. | 52/638 |
| 4,783,940 A | 11/1988 | Sato et al. | |
| 4,905,436 A | 3/1990 | Matsuo et al. | |
| 4,958,970 A * | 9/1990 | Rose et al. | 411/12 |
| 5,082,166 A | 1/1992 | Matsuo et al. | |
| 5,310,298 A | 5/1994 | Hwang | |
| 5,410,847 A | 5/1995 | Okawa et al. | |
| 5,595,040 A | 1/1997 | Chen | |
| 5,680,738 A | 10/1997 | Allen et al. | |
| 5,685,662 A | 11/1997 | Rollin et al. | |
| 6,059,482 A | 5/2000 | Beauvoir | |
| 6,073,405 A | 6/2000 | Kasai et al. | |
| 6,138,427 A | 10/2000 | Houghton | |

(Continued)

FOREIGN PATENT DOCUMENTS

WO   WO 2007/147793   12/2007

*Primary Examiner* — William Gilbert
*Assistant Examiner* — Gisele Ford
(74) *Attorney, Agent, or Firm* — Dority & Manning, P.A.

(57) ABSTRACT

A wind turbine lattice tower structure includes a plurality of structural members connected together to define an open lattice tower, with the structural members including vertical leg members and diagonal braces extending between the vertical leg members. Pairs of the diagonal braces form cross braces having an intersection point therebetween. A damping bolt connection assembly is provides at the intersection point of the cross braces and is configured to attach the cross braces together at the intersection point while providing for relative movement of each individual cross brace along a defined longitudinal section of the other respective cross brace.

19 Claims, 5 Drawing Sheets

U.S. PATENT DOCUMENTS

| | | |
|---|---|---|
| 6,219,989 B1 | 4/2001 | Tumura |
| 6,427,393 B1 | 8/2002 | Chen et al. |
| 6,516,583 B1 | 2/2003 | Houghton |
| 6,591,573 B2 | 7/2003 | Houghton |
| 7,127,863 B2 | 10/2006 | Simmons |
| 7,204,667 B2 | 4/2007 | Uno |
| 2004/0211140 A1 | 10/2004 | Suzuki et al. |
| 2006/0272244 A1 | 12/2006 | Jensen |
| 2008/0256892 A1 | 10/2008 | Franke |
| 2008/0289268 A1* | 11/2008 | Sarkisian ............... 52/167.9 |
| 2010/0180533 A1 | 7/2010 | Spiegel et al. |
| 2010/0242406 A1 | 9/2010 | Oliphant et al. |

* cited by examiner

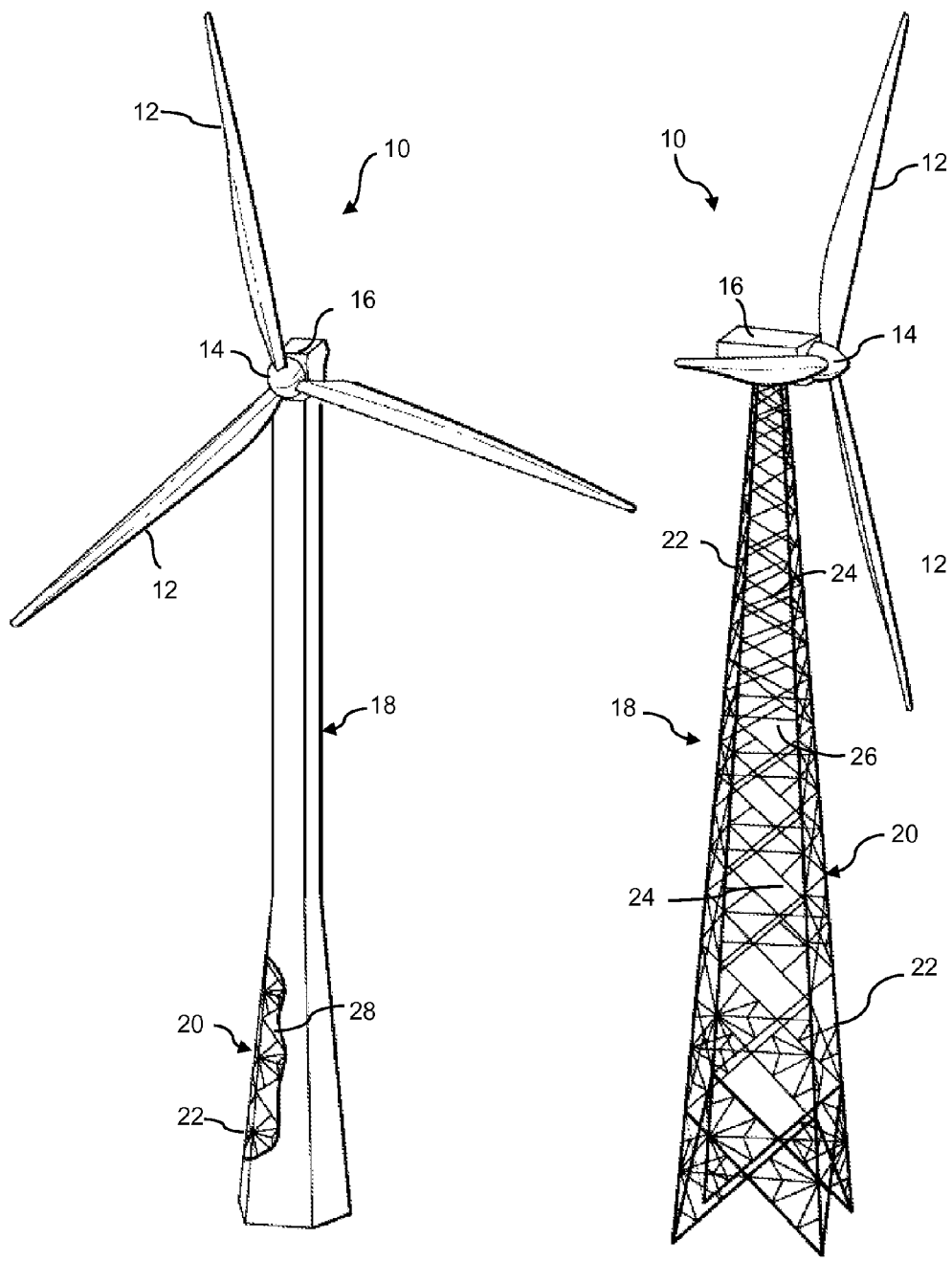
FIG. -1-  FIG. -2-

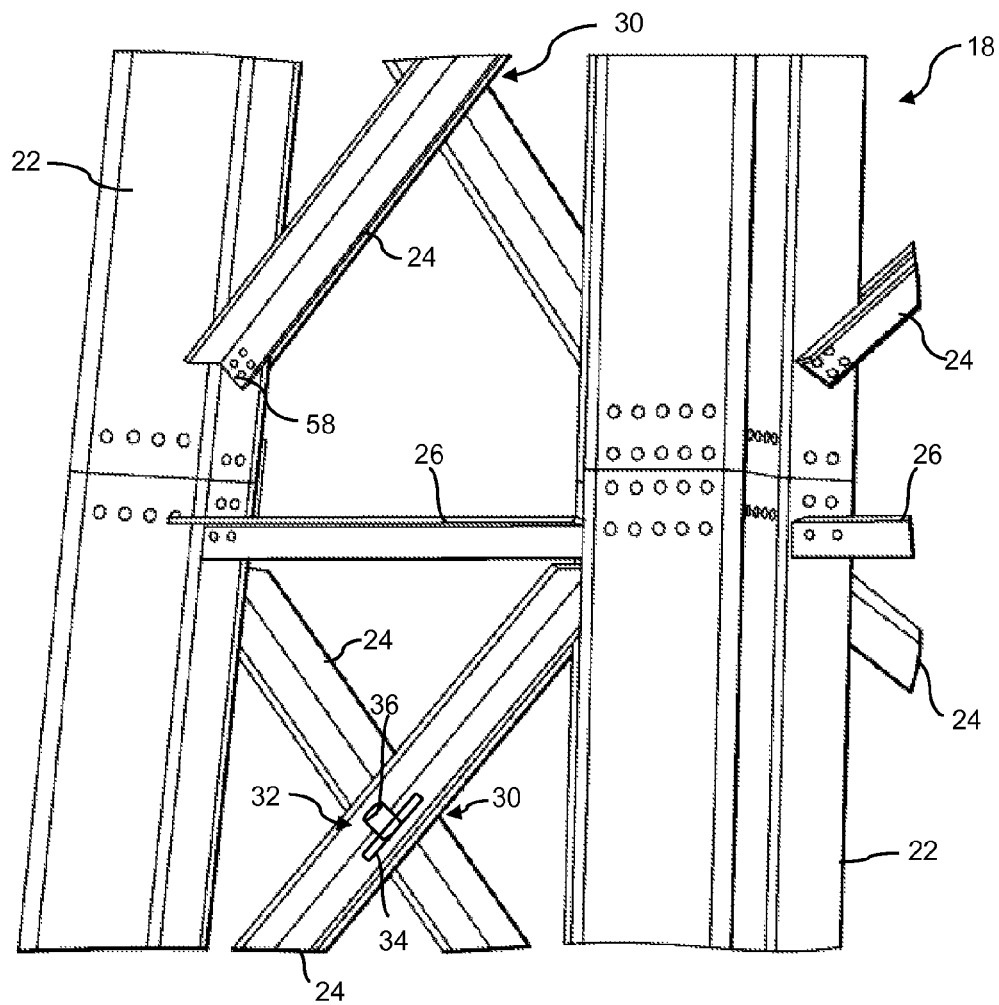
FIG. -3-

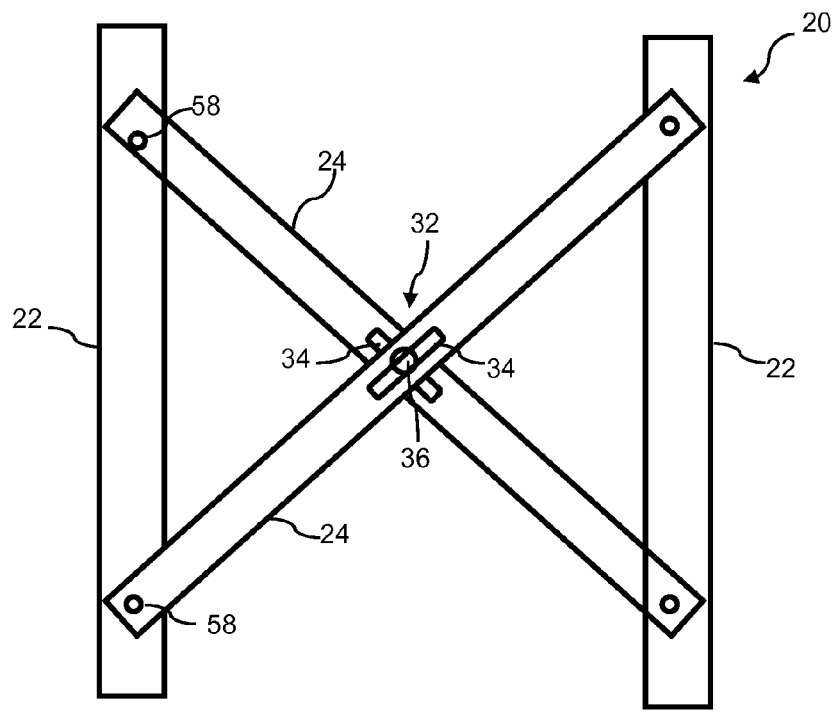
FIG. -4-
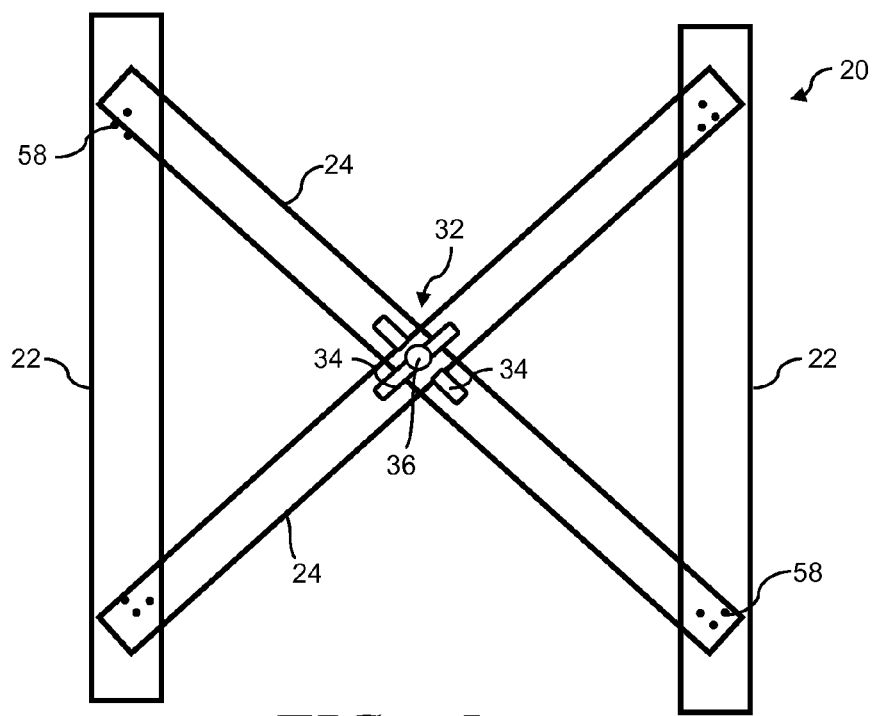
FIG. -5-

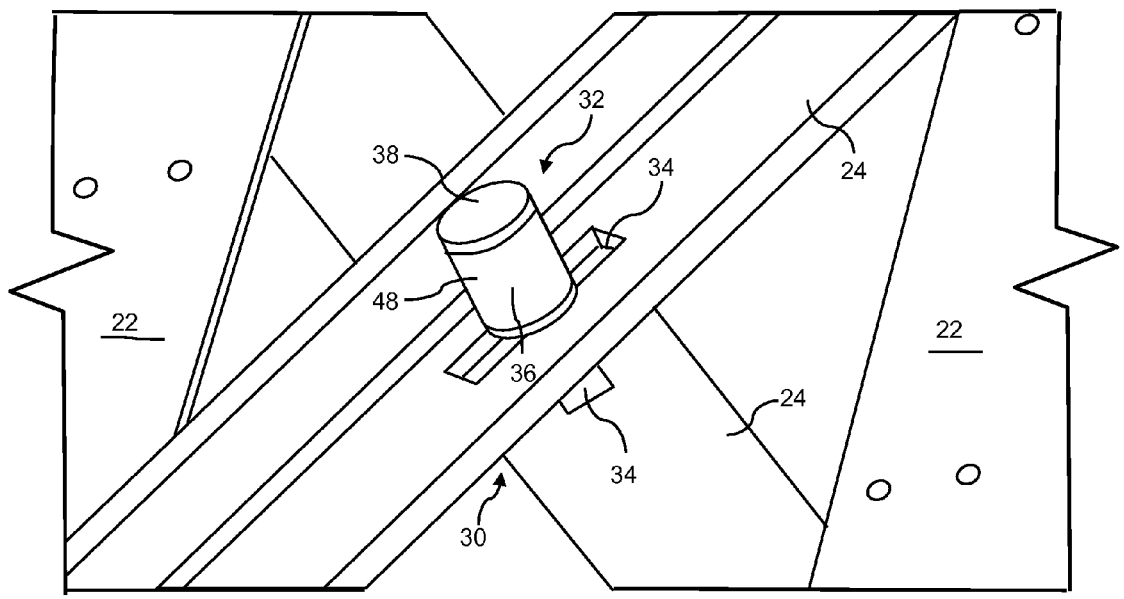
FIG. -6-
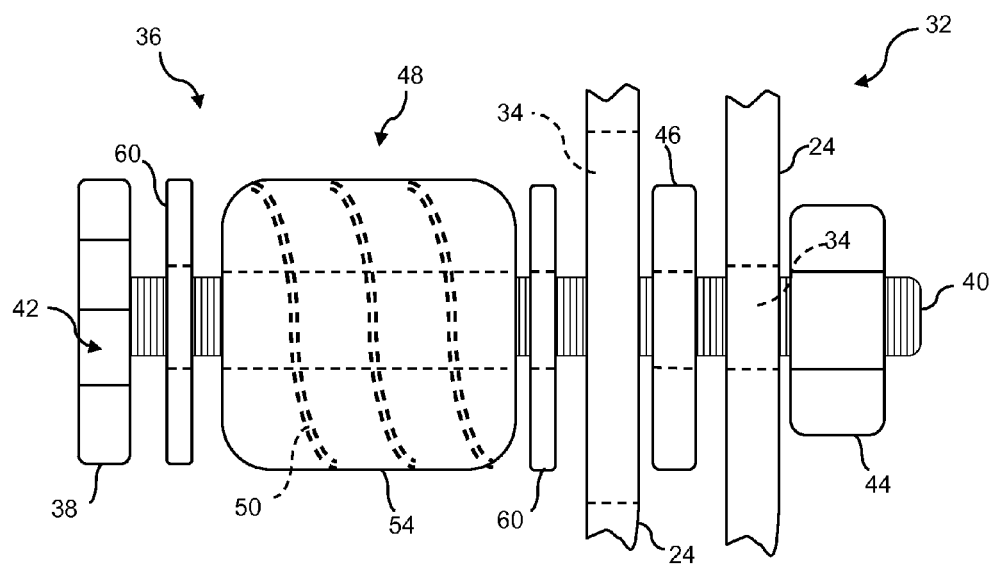
FIG. -7-

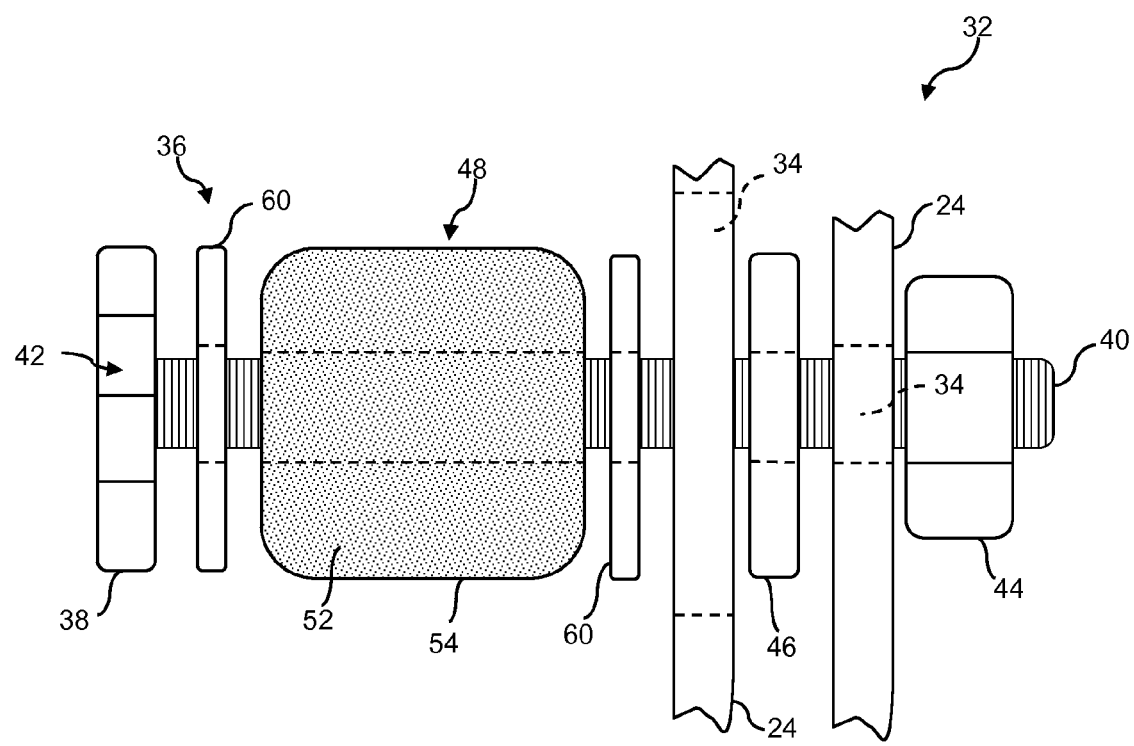
FIG. -8-

FRICTION DAMPING BOLT CONNECTION FOR A WIND TOWER LATTICE STRUCTURE

FIELD OF THE INVENTION

The present invention relates generally to wind turbine tower structures, and more particularly to an improved bolt connection for lattice tower structures.

BACKGROUND OF THE INVENTION

Conventional wind turbine towers typically include a tubular pole or a lattice structure to support a wind turbine at a considerable height to capture wind energy. The tubular pole configuration is relatively more simple and easier to assemble than the lattice structure. However, tubular poles use more steel than the lattice structure, resulting in a cost disadvantage with rising prices of steel.

The lattice structure towers use significantly less steel and other materials as compared to conventional tubular towers (generally about 30%-40% less). The lattice towers, however, lack the torsional rigidity of the tubular constructions and this decreased torsional stiffness potentially induces vibrations and stresses in the tower that must be compensated for.

It is known in the civil engineering and construction arts to incorporate damping devices and materials in structures to reduce vibrations, harmonics, and the like. An effective and practical means of damping lattice frame wind towers, however, has not been achieved. In fact, the conventional practice of rigid connections (e.g. bolt or weld connections) at the numerous joints between the vertical structural elements ("legs") and the cross braces that extend between the legs, as well as at the intersection of the cross braces, may even exacerbate the vibrations and resulting stresses. Vibrations caused by wind against the wind turbine tower may even loosen bolted connections over time.

Accordingly, an improved means for providing effective and practical damping to a lattice frame wind tower, without detracting from the inherent benefits of the structure as compared to tubular towers, is desired.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine lattice tower structure includes a plurality of structural members connected together to define an open lattice tower. The structural members include, for example, vertical leg members and diagonal braces extending between the vertical leg members. Pairs of the diagonal braces form cross braces that cross at an intersection point. A damping bolt connection assembly is operably disposed at the intersection point of the cross braces and is configured to attach the cross braces together at the intersection point while providing for relative movement of each individual cross brace along a defined longitudinal section of the other respective cross brace.

In a particular embodiment, the damping bolt connection assembly includes a longitudinally elongated slot defined in each of the cross braces, with the slots overlying at the intersection point. A pin component having a shaft, such as a threaded bolt and nut, extends through the slots and connects the cross braces together at the intersection point. In this manner, the elongated slots define the range of relative movement of each of cross brace relative to the other cross brace.

It certain embodiments, a friction disk is disposed between facing surface of the cross braces at the intersection point. The friction disk is formed from a friction-enhancing material that increases the friction of the relative sliding movement between the facing surfaces of the cross braces, thus adding additional vibration damping into the system.

In some embodiments, a spring mechanism may be configured on the shaft to exert a constant clamping force between the pin and the cross braces, for example in situations when vibrations would tend to loosen a threaded bolt connection at the intersection point. In this arrangement, the pin component includes a head (such as the head of a bolt, and the spring mechanism includes a mechanical spring disposed concentric with the shaft between the head and the proximal cross brace to urge the head axially away from the cross braces. The mechanical spring may be any manner of spring, such as a leaf spring, coiled spring, spring washer, and so forth.

In other embodiments the spring mechanism may include a cylindrical elastomeric material member, such as a rubber or rubber-like cylinder, disposed concentric with the shaft between the head and proximal cross braces to urge the head axially away from the cross braces. The pin component may be a threaded bolt that is secured to the cross braces with a nut, with the bolt tightened against the opposed biasing force of the elastomeric material member. The elastomeric material member may be restrained in a rigid outer circumferential sleeve.

In one embodiment, the cross braces have longitudinal ends that are non-rotationally fixed to the vertical leg members. For example, a plurality of bolts, rivets, or other connectors may be used at the attachment point of the longitudinal ends to prevent rotational movement of the ends relative to the vertical leg members.

In another embodiment, increased movement and flexibility between the cross braces and vertical leg members may be desired, and the longitudinal ends of the cross braces are rotationally fixed to the vertical leg members. For example, a single bolt, rivet, or the like may be used to attach the members and may define a pivot point for relative (limited) rotational motion between the cross brace and vertical leg member.

It should be appreciated that the present invention encompasses any manner of wind turbine lattice tower structure having any combination of the various features and characteristics set forth above and discussed in greater detail below.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine with a lattice tower structure;

FIG. 2 is a perspective view of an alternative embodiment of a wind turbine with a lattice tower structure;

FIG. 3 is a detailed perspective view of structural components of a wind turbine lattice tower structure particularly illustrating a damping bolt connection assembly at the intersection of a pair of cross braces;

FIG. 4 is a schematic view of an embodiment of a damping bolt connection at the intersection of a pair of cross braces;

FIG. 5 is a schematic view of an alternative embodiment of a damping bolt connection at the intersection of a pair of cross braces;

FIG. 6 is a partial perspective view of an embodiment of a damping bolt connection;

FIG. 7 is an in-line component view of an embodiment of a damping bolt connection; and FIG. 8 is an in-line component view of an alternative embodiment of a damping bolt connection.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 are perspective views of exemplary wind turbines 10. Each wind turbine 10 includes a plurality of blades 12 mounted to a rotor hub 14, which in turn is rotationally supported any manner of power generation components housed within a nacelle 16, as is well known in the art. The nacelle 16 is supported atop a tower structure 18, which in the illustrated embodiments is an open lattice structure formed by vertically oriented legs 22, horizontal braces 26, and diagonal braces 24. The legs 22 are typically angle iron members or pipe members, and the braces 24, 26 are typically angle iron members. These lattice frame tower structures 18 are also referred to in the art as "space frame" towers. The lattice tower structure 18 may be fabricated in sections and erected at the wind turbine site.

In the embodiment of FIG. 1, a cladding material 28 is applied over the lattice structure, which may be any type of suitable fabric, such as an architectural fabric designed for harsh weather conditions. The cladding 28 protects workers and equipment within the tower and provides an aesthetic appearance to the wind turbine 10.

FIG. 3 is a more detailed view of components of the lattice structure tower 18, and particularly illustrates the connection locations between the braces 24, 26 and the legs 22. The diagonal braces 24 extend between vertical legs 22, and certain pairs of these diagonal braces 24 form pairs of cross braces that cross at an intersection point 30. A vibration/oscillation damping bolt connection assembly 32 is utilized at the intersection point 30 of the cross braces 24 to physically attach the braces 24 together yet, at the same time, allow or a defined degree of longitudinal movement of the respective cross braces relative to each other. Any one or combination of the cross braces 24 within the tower structure 18 may incorporate the damping bolt connection assembly 32, and it should be appreciated that not every pair of cross braces within the tower structure 18 need have the damping bolt connection assembly 32. The combination of damping bolt connection assemblies 32 serve to diminish vibrations and "swaying" of the tower structure 18 that are inherently produced by a combination of factors, such as wind speed and direction, load on the wind turbine, blade imbalances, and so forth. Embodiments of the damping bolt connection 32 are described in greater detail below.

Referring to FIGS. 4 through 8 in general, an embodiment of a damping bolt connection assembly 32 includes elongated slots 34 defined in the cross braces 24 such that the slots 34 overly at the intersection point 30. The longitudinal length of each respective slot 34 defines the range of relative movement between the respective braces 24. A pin component 36 includes a head 38 and a shaft 40 that extends through the overlying slots 34. In a particular embodiment, the pin component 36 is a threaded bolt 42 that is engaged by a nut 44. In other embodiments, the pin component 36 may be, for example, a rivet, rod, or other like device. The pin component 36 serves to physically connect the cross braces 24 together at the intersection point 30 while allowing for relative movement of the braces 24.

Referring to FIGS. 7 and 8, a friction-enhancing member, such as a friction disk 46, may be provided on the shaft 40 between the facing surfaces of the braces 24. This disk 46 is formed of any manner of known friction-enhancing material and promotes increased sliding friction between the braces 24, thus further serving to dampen vibrations within the system.

A spring mechanism 48 may be incorporated with the pin component 36 to apply a constant tensioning or clamping force to the braces 24 during relative movement of the braces or other structural members of the tower structure 18, or loosening of the nut 44 that may occur over time or due to structural vibrations. In the illustrated embodiments, the threaded bolt 42 is tightened against the biasing force of the spring mechanism 48 such that a constant axially directed tensioning force is generated along the bolt. The spring mechanism 48 may be variously configured. For example, in the embodiment of FIG. 7, the spring mechanism 48 may include a mechanical spring 50, such as a coiled or leaf spring. The mechanical spring 50 may be encased in a housing or sleeve 54 that is flanked by washers 60.

In the embodiment of FIG. 8, the spring mechanism 48 utilizes a cylindrical elastomeric material member 52, such as a rubber or rubber-like cylinder, disposed concentric with the shaft 40 between the head 38 and cross braces 24 to urge the head 38 axially away from the cross braces. The elastomeric material member 52 may be restrained in a rigid outer circumferential sleeve 54 such that compression of the material is restrained and directed axially along the member 52. The sleeve 54 may be flanked by washers 60.

Referring to FIG. 5, in certain embodiments, the cross braces 24 may have longitudinal ends that are non-rotationally fixed to the vertical leg members 22, for example by a plurality of bolts 58, rivets, weld, or the like. In this embodiment, the cross braces are rigidly fixed to their respective leg members 22 are do not move independently of the leg members.

In the embodiment of FIG. 4, increased movement and flexibility between the cross braces 24 and vertical leg members 22 is achieved with a rotational connection between the longitudinal ends of the cross braces 24 and vertical leg members 22. For example, a single bolt 58, rivet, or the like may be used to attach the braces 24 to the leg members 22 and define a pivot point for relative (limited) rotational motion between the cross brace 24 and vertical leg member 22.

It should be appreciated that the present invention encompasses any manner of wind turbine lattice tower structure 18 having any combination of the various features and characteristics set forth above related to the damping bolt connection assembly 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine lattice tower structure, comprising:
    a plurality of structural members connected together to define an open lattice tower, said structural members including vertical leg members and diagonal braces;
    pairs of said diagonal braces forming cross braces having an intersection point therebetween, each of said cross braces comprising a single structural member extending continuously between said vertical leg members;
    a damping bolt connection assembly at said intersection point of said cross braces, said damping bolt connection assembly attaching said cross braces together at said intersection point while providing for relative movement of each individual cross brace along a defined longitudinal section of the other said respective cross brace; and
    said damping bolt connection assembly comprising longitudinally elongated and overlying slots defined in said cross braces at said intersection point, and a pin component having a shaft that extends through said slots and connects said cross braces together at said intersection point, wherein said elongated slots define the range of relative movement of one said cross brace relative to the other said cross brace, wherein each one said cross brace only configured to move relative the other said cross brace at said intersection point.

2. The wind turbine lattice structure as in claim 1, wherein said pin component and shaft comprise a threaded bolt that is secured to said cross braces with a nut.

3. The wind turbine lattice structure as in claim 1, further comprising a friction disk disposed between facing surface of said cross braces at said intersection point, said friction disk formed from a material that enhances sliding friction between said facing surfaces of said cross braces.

4. The wind turbine lattice structure as in claim 1, further comprising a spring mechanism placed on said shaft that exerts a constant clamping force between said pin and said cross braces.

5. The wind turbine lattice structure as in claim 4, wherein said pin component comprises a head, said spring mechanism comprises a mechanical spring disposed concentric with said shaft between said head and one of said cross braces to urge said head axially away from said cross braces.

6. The wind turbine lattice structure as in claim 5, wherein said pin component comprises a threaded bolt that is secured to said cross braces with a nut, said bolt tightened against the opposed biasing force of said mechanical spring.

7. The wind turbine lattice structure as in claim 4, wherein said pin component comprises a head, said spring mechanism comprising a cylindrical elastomeric material member disposed concentric with said shaft between said head and one of said cross braces to urge said head axially away from said cross braces.

8. The wind turbine lattice structure as in claim 7, wherein said pin component comprises a threaded bolt that is secured to said cross braces with a nut, said bolt tightened against the opposed biasing force of said elastomeric material member.

9. A wind turbine lattice tower structure, comprising:
    a plurality of structural members connected together to define an open lattice tower, said structural members including vertical leg members and diagonal braces extending between said vertical leg members;
    pairs of said diagonal braces forming cross braces having an intersection point therebetween;
    a damping bolt connection assembly at said intersection point of said cross braces, said damping bolt connection assembly attaching said cross braces together at said intersection point while providing for relative movement of each individual cross brace along a defined longitudinal section of the other said respective cross brace;
    said damping bolt connection assembly comprising longitudinally elongated and overlying slots defined in said cross braces at said intersection point, and a pin component having a head and a shaft that extends through said slots and connects said cross braces together at said intersection point, wherein said elongated slots define the range of relative movement of one said cross brace relative to the other said cross brace;
    a spring mechanism placed on said shaft that exerts a constant clamping force between said pin and said cross braces;
    said spring mechanism comprising a cylindrical elastomeric material member disposed concentric with said shaft between said head and one of said cross braces to urge said head axially away from said cross braces; and
    wherein said elastomeric material member further comprises a rigid outer circumferential sleeve.

10. The wind turbine lattice structure as in claim 1, wherein said cross braces have longitudinal ends non-rotationally fixed to said vertical leg members.

11. The wind turbine lattice structure as in claim 1, wherein said cross braces have longitudinal ends rotationally fixed to said vertical leg members.

12. The wind turbine lattice structure as in claim 11, comprising a single pin connection between said longitudinal ends and said vertical leg members, wherein said cross braces may partially rotate relative to said vertical leg members via said pin connection.

13. A wind turbine lattice tower structure, comprising:
    a plurality of structural members connected together to define an open lattice tower, said structural members including vertical leg members and diagonal braces extending between said vertical leg members;
    pairs of said diagonal braces forming cross braces having an intersection point therebetween, each of said cross braces comprising a single structural member extending continuously between said vertical leg members;
    a damping bolt connection assembly at said intersection point of said cross braces, said damping bolt connection assembly attaching said cross braces together at said intersection point while providing for relative movement of each individual cross brace along a defined longitudinal section of the other said respective cross brace;
    said damping bolt connection assembly comprising longitudinally elongated and overlying slots defined in said cross braces at said intersection point, and a pin component having a shaft that extends through said slots and connects said cross braces together at said intersection point, wherein each one said cross brace only configured to move relative the other said cross brace at said intersection point;

a friction disk disposed between facing surface of said cross braces at said intersection point, said friction disk formed from a material that enhances sliding friction between said facing surfaces of said cross braces; and a spring mechanism on said shaft that exerts a constant clamping force between said pin and said cross braces.

14. The wind turbine lattice structure as in claim 13, wherein said pin component comprises a head, said spring mechanism comprising a mechanical spring disposed concentric with said shaft between said head and one of said cross braces to urge said head axially away from said cross braces.

15. The wind turbine lattice structure as in claim 14, wherein said pin component comprises a threaded bolt that is secured to said cross braces with a nut, said bolt tightened against the opposed biasing force of said mechanical spring.

16. The wind turbine lattice structure as in claim 13, wherein said pin component comprises a head, said spring mechanism comprising a cylindrical elastomeric material member disposed concentric with said shaft between said head and one of said cross braces to urge said head axially away from said cross braces.

17. The wind turbine lattice structure as in claim 16, wherein said pin component comprises a threaded bolt that is secured to said cross braces with a nut, said bolt tightened against the opposed biasing force of said elastomeric material member.

18. The wind turbine lattice structure as in claim 17, wherein said elastomeric material member further comprises a rigid outer circumferential sleeve.

19. The wind turbine lattice structure as in claim 13, wherein said cross braces have longitudinal ends rotationally fixed to said vertical leg members.

* * * * *